(12) United States Patent
Rakshit et al.

(10) Patent No.: US 10,091,482 B1
(45) Date of Patent: Oct. 2, 2018

(54) CONTEXT AWARE MIDAIR PROJECTION DISPLAY

(71) Applicant: International Business Machines Corporation, Armonk, NY (US)

(72) Inventors: Sarbajit K. Rakshit, Kolkata (IN); Mukundan Sundararajan, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/669,147

(22) Filed: Aug. 4, 2017

(51) Int. Cl.
- *H04N 9/31* (2006.01)
- *H04N 13/04* (2006.01)
- *G06K 9/00* (2006.01)

(52) U.S. Cl.
CPC ..... *H04N 13/0497* (2013.01); *G06K 9/00302* (2013.01); *H04N 9/3147* (2013.01); *H04N 9/3179* (2013.01); *H04N 13/047* (2013.01); *H04N 13/0484* (2013.01); *H04N 13/0488* (2013.01)

(58) Field of Classification Search
CPC ............ H04N 13/0497; H04N 9/3147; H04N 9/3179; H04N 13/047; H04N 13/0484; H04N 13/0488; G06K 9/00302
See application file for complete search history.

(56) References Cited

U.S. PATENT DOCUMENTS

| | | | |
|---|---|---|---|
| 6,031,519 A * | 2/2000 | O'Brien | G03H 1/0005 345/156 |
| 6,323,971 B1 | 11/2001 | Klug | |
| 8,675,067 B2 | 3/2014 | Chou et al. | |
| 2006/0139362 A1* | 6/2006 | Lin | G06F 3/0425 345/581 |
| 2010/0110384 A1 | 5/2010 | Maekawa | |
| 2014/0111479 A1 | 4/2014 | Krah et al. | |
| 2015/0015671 A1* | 1/2015 | Kellerman | G06F 3/012 348/46 |
| 2015/0042640 A1 | 2/2015 | Algreatly | |
| 2015/0244747 A1 | 8/2015 | Wickenkamp et al. | |

(Continued)

OTHER PUBLICATIONS

"What Is Heliodisplay", retrieved from http://thedetectivenovel.blogspot.in/2010/06/what-is-heliodisplay.html, Jun. 2010.

(Continued)

*Primary Examiner* — Michael Lee
(74) *Attorney, Agent, or Firm* — Brown & Michaels, PC; David Woycechowsky (57) ABSTRACT

Projecting midair projections in a 3D space for multiple users, such that the midair projection is not an obstacle to users within the 3D space. The restricted area in which the midair projection should not be displayed is determined by identifying users which are having face to face interactions and an associated level of interactions of the identified users. Then the focus areas of the identified users and attention level of the identified users on the focus areas are determined and the focus areas of the identified users are aggregated to restrict midair projections from the aggregated focus areas of the identified users and designated area not in the aggregated focus cones as content allowed areas where content can be projected in midair without disturbing other identified users.

15 Claims, 4 Drawing Sheets

(56) References Cited

U.S. PATENT DOCUMENTS

| | | | | |
|---|---|---|---|---|
| 2015/0287244 | A1* | 10/2015 | Watanabe | G06T 19/006 345/633 |
| 2015/0302869 | A1* | 10/2015 | Tomlin | G10L 25/78 704/246 |
| 2016/0041625 | A1 | 2/2016 | Maizels et al. | |
| 2017/0052507 | A1* | 2/2017 | Poulos | G06F 3/00 |
| 2017/0097677 | A1* | 4/2017 | McLean | G06F 3/013 |

OTHER PUBLICATIONS

"Heliodisplay", retrieved from http://electroniamgce.blogspot.in/2011/01/heliodisplay.html; Jul. 2011.

Williams, A. "Lela Display System: The mid-air touchscreen you can control with your whole body", retrieved from http://newatlas.com/leia-display-interactive-mist/34165/: Oct. 2014.

"Fogscreen Projection Screen Replica—Freefloating Images!", retrieved from http://www.instructables.com/id/Fogscreen-Projection-Screen-Replica-Freefloating-i/; as early as Sep. 2013.

"FogScreen Projection Screen", retrieved from http://www.fogscreen.com/; as early as Aug. 2003.

"Heliodisplay—Wikipedia", retrieved from https://en.wikipedia.org/wiki/Heliodisplay; as early as Dec. 2005.

Campbel, M. "Apple patents glasses-free interactive holographic touchscreen display", retrieved from http://appleinsider.com/articles/14/09/30/apple-patents-glasses-free-interactive-holographic-touchscreen-display; Sep. 2014.

"Samsung Invents a Futuristic Holographic-like User Interface", retrieved from http://www.patentlymobile.com/2014/06/samsung-invents-a-futuristic-holographic-like-user-interface.html; Jun. 2014.

Doitscher, L. "LG is taking holograms mobile", retrieved from http://declassifiled.com/2015/10/lg-is-taking-holograms-mobile/; Oct. 2015.

"Sound sculpting lets you feel 3D holograms", retrieved from https://www.youtube.com/watch?v=IMMdQTkfne8&feature=youtu.be; Dec. 2014.

"Method and System for Midair Projection Display" published Aug. 2, 2017.

* cited by examiner

CONTEXT AWARE MIDAIR PROJECTION DISPLAY

BACKGROUND

The present invention relates to image displays, and more specifically to projection displays which display images in midair.

A projection display can be created in midair. One example of a system to create such displays is a combination of a holographic projector and pico-projector. Any digital contents can be projected in the midair projection display using a system known to the art.

In a "smart house", many of the devices and appliances in the home are connected by a network, often wirelessly, so they can talk to each other and to a home controller. While this term is sometimes used as merely a fancy remote control system for devices connected to the "Internet of Things", a smart home can be much more, monitoring the activities of its occupants and anticipating their needs.

In a smart house, a user might be watching a video, having a face to face discussion with another user at a remote location, or partaking in some other activity. The video display for these activities might be projected in midair for the user, using the technology referred to above or other technologies now known or developed in the future, under the control of a home server computer, which determines where to project the midair display for the convenience of the user.

While watching the midair display, the user might change his focus direction to some other place. If the midair projection display is projected near his eye, then it will create an obstacle to the user, and the midair display might also be an obstacle to some other associated nearby user.

SUMMARY

According to one embodiment of the present invention, a method of projecting midair projections in a 3D space for multiple users is disclosed. The method comprising the steps of: a) a computer identifying users which are having face to face interactions and an associated level of interactions of the identified users; b) the computer determining focus areas of the identified users and attention level of the identified users on the focus areas; c) the computer aggregating the focus areas of the identified users to restrict midair projections from the aggregated focus areas of the identified users and designated area not in the aggregated focus cones as content allowed areas where content can be projected in midair without disturbing other identified users; and d) the computer displaying a midair projection in the content allowed area to at least one identified user.

According to another embodiment of the present invention, a computer program product for projecting midair projections in a 3D space for multiple users is disclosed. The computer program product having a computer comprising at least one processor, one or more memories, one or more computer readable storage media. The computer program product comprising a computer readable storage medium having program instructions embodied therewith. The program instructions executable by the computer to perform a method comprising: a) identifying, by the computer, users which are having face to face interactions and an associated level of interactions of the identified users; b) determining, by the computer, focus areas of the identified users and attention level of the identified users on the focus areas; c) aggregating, by the computer, the focus areas of the identified users to restrict midair projections from the aggregated focus areas of the identified users and designated area not in the aggregated focus cones as content allowed areas where content can be projected in midair without disturbing other identified users; and d) displaying, by the computer, a midair projection in the content allowed area to at least one identified user.

According to another embodiment of the present invention, a computer system for projecting midair projections in a 3D space for multiple users is disclosed. The computer system comprising a computer comprising at least one processor, one or more memories, one or more computer readable storage media having program instructions executable by the computer to perform the program instructions. The program instructions comprising: a) identifying, by the computer, users which are having face to face interactions and an associated level of interactions of the identified users; b) determining, by the computer, focus areas of the identified users and attention level of the identified users on the focus areas; c) aggregating, by the computer, the focus areas of the identified users to restrict midair projections from the aggregated focus areas of the identified users and designated area not in the aggregated focus cones as content allowed areas where content can be projected in midair without disturbing other identified users; and d) displaying, by the computer, a midair projection in the content allowed area to at least one identified user.

DETAILED DESCRIPTION

Figure 1:
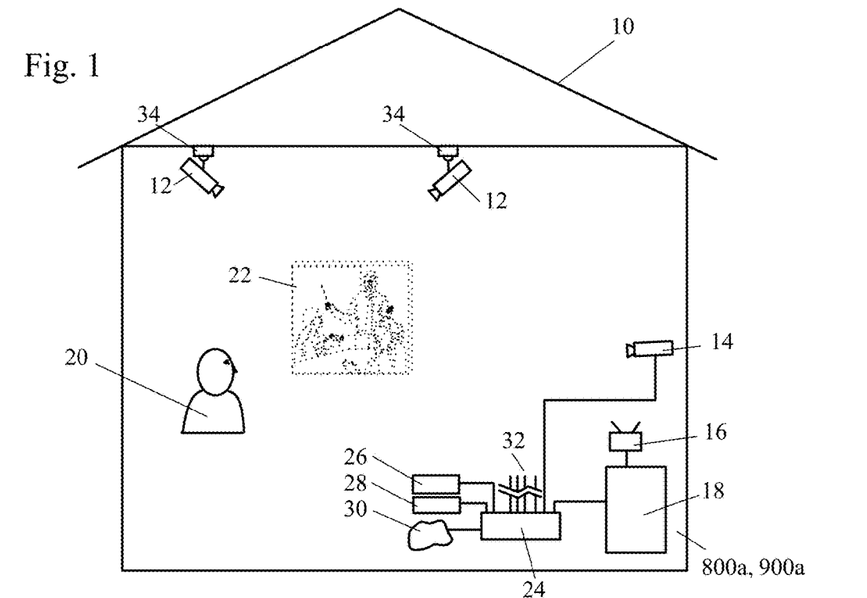
FIG. 1 shows a diagram of a user interacting with a midair display in a smart house.

FIG. 1 shows an example of a "smart house" 10, in which a single user 20 is looking at a display 22 projected in mid-air at a location in the house. The display 22 can be projected by a plurality of projectors 12, which may be holographic projectors or pico projectors or the like, which are mounted around the house 10 on the walls or ceiling. Preferably, the projectors 12 are mounted on a thrust bearing and pivot joint 34, which allows a motor to rotate and change the angle of the projector 12, thus moving the midair image 22 around the house 10. The various pieces of equipment in the smart house 10 will be controlled by a central server computer 18, which is networked to the various pieces of equipment in the house 10 through a wireless access point 16 and/or wired router or switch 24.

Figure 5:
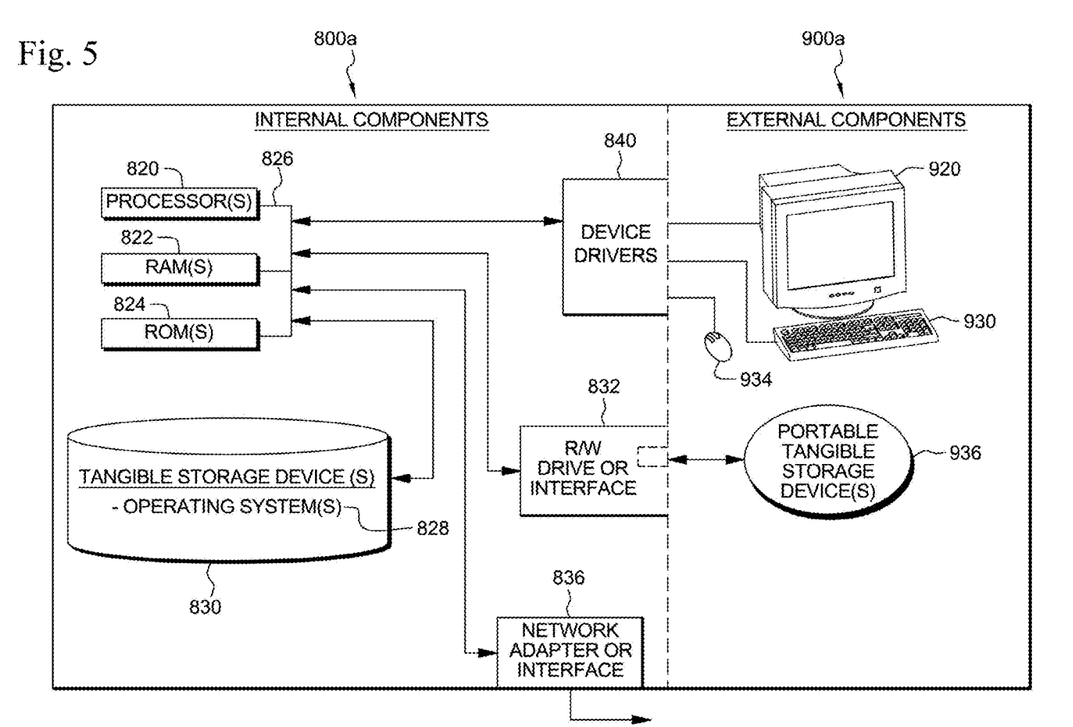
FIG. 5 illustrates internal and external components of a components of the "smart house" in which illustrative embodiments may be implemented.

The components of the "smart house", including, but not limited to the display 22, projector 12, central server computer 18, wireless access point 16, switch 24 includes a set of internal components 800a and a set of external components 900a, further illustrated in FIG. 5.

FIG. 5 illustrates internal and external components of components of the "smart house" 10, including, but not limited to display 22, projector 12, central server computer 18, wireless access point 16, switch 24, in which illustrative embodiments may be implemented. In FIG. 5, the components include respective sets of internal components 800*a* and external components 900*a*. Each of the sets of internal components 800*a* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800*a* also includes a R/W drive or interface 832 to read from and write to one or more portable computer-readable tangible storage devices 936 such as a CD-ROM, DVD, memory stick, magnetic tape, magnetic disk, optical disk or semiconductor storage device. Software can be stored on one or more of the portable computer-readable tangible storage devices 936, read via R/W drive or interface 832 and loaded into hard drive 830.

Each set of internal components 800*a* also includes a network adapter or interface 836 such as a TCP/IP adapter card. Software can be downloaded to the components from an external computer via a network (for example, the Internet, a local area network or other, wide area network) and network adapter or interface 836. From the network adapter or interface 836, software is loaded into hard drive 830. Software can be downloaded to the server computer 18 from an external computer via a network (for example, the Internet, a local area network or other, wide area network) and network adapter or interface 836. From the network adapter or interface 836, software is loaded into hard drive 830. The network may comprise copper wires, optical fibers, wireless transmission, routers, firewalls, switches, gateway computers and/or edge servers.

Each of the sets of external components 900*a* includes a computer display monitor 920, a keyboard 930, and a computer mouse 934. Each of the sets of internal components 800*a* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Software can be written in various programming languages including low-level, high-level, object-oriented or non object-oriented languages. Alternatively, the functions of software can be implemented in whole or in part by computer circuits and other hardware (not shown).

Figure 2:
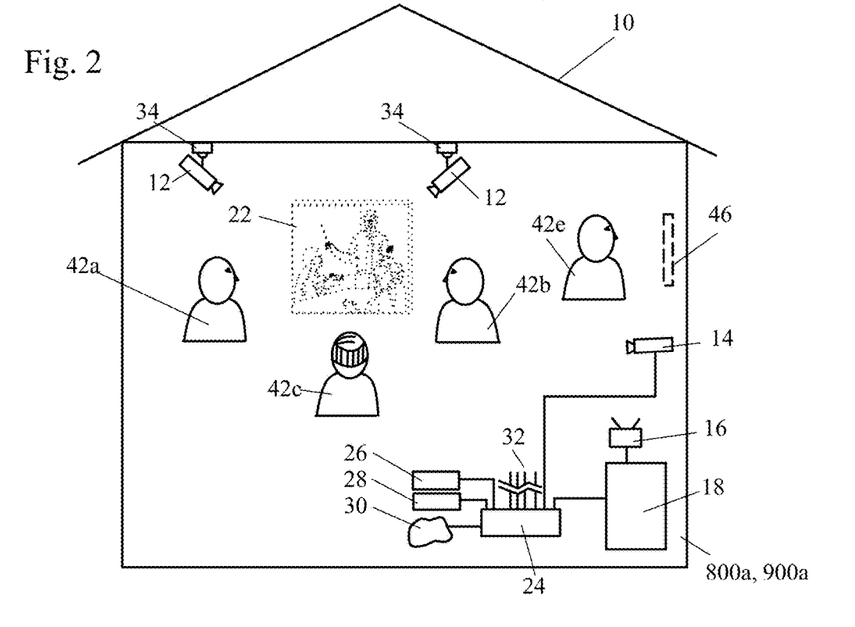
FIG. 2 shows a diagram of multiple users in the smart house of FIG. 1.

In the example of FIGS. 1 and 2, these pieces of equipment include a camera 14, a storage device 26 and a source of programming 28 (which might be, for example, a video player). The router 24 can also link the server computer 18 to a wide-area network 30 such as the Internet, and additional wires or cables 32 can lead to other devices around the house 10.

This setup is straightforward if there is only a single viewer, as shown in FIG. 1. The display 22 can float in midair, and the user 20 can watch it. However, if there is more than one user for the system, as shown in FIG. 2, the situation becomes more complicated. In the example of FIG. 2, there are now four users in the smart house 10—Arthur 42*a*, Bob 42*b*, Charlie 42*c* and David 42*d*. David 42*d* is watching a display 46, separate from the other three, but Arthur 42*a*, Bob 42*b* and Charlie 42*c* are circled around the midair display 22, interacting with each other. In this situation, the midair display 22 will block the field of view from Arthur 42*a* to Bob 42*b*, which can be annoying for the two. Moreover, while the display 22 is not blocking Charlie's 42*c* view of one of the other participants, he might find it distracting when he is trying to pay attention to Arthur 42*a* or Bob 42*b*.

Figure 3:
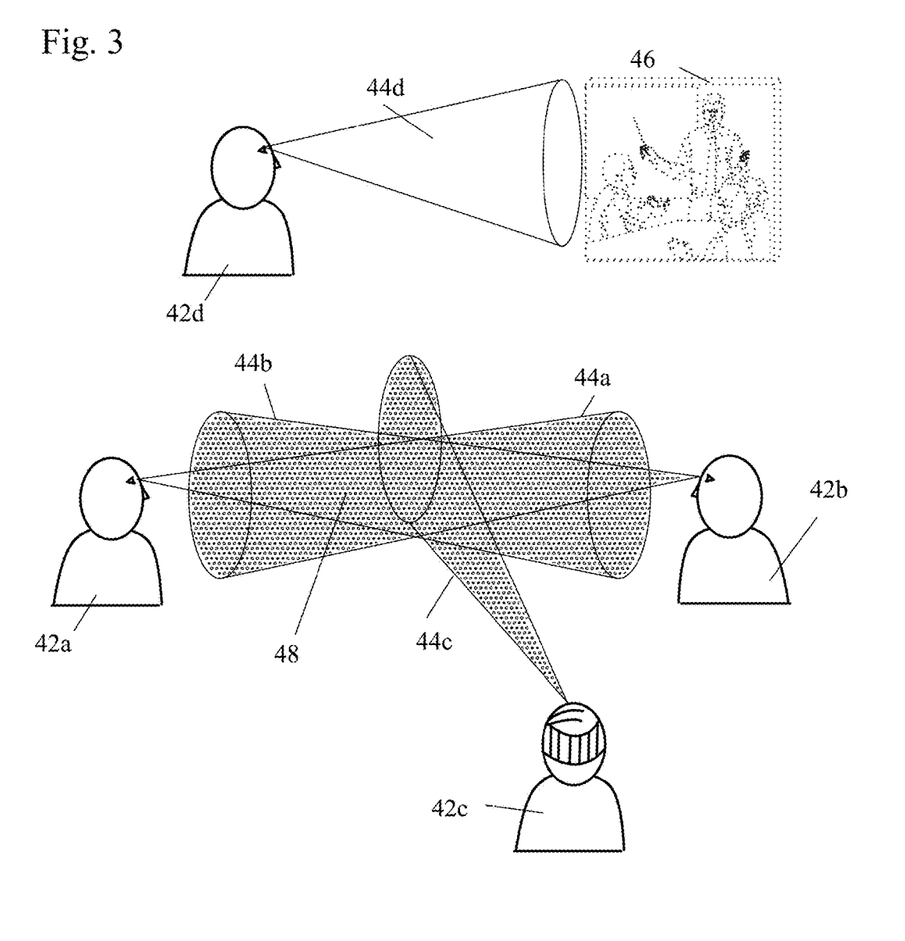
FIG. 3 shows a diagram of multiple users in a smart house, with a midair display.

FIG. 3 shows the four users from FIG. 2, annotated to show their fields of view. As can be seen, David 42*d* has an unobstructed view of display 46. Arthur 42*a* has a field of view 44*a*, which forms a cone outwardly of his eyes, aimed toward Bob 42*b*. Bob 42*b*, in turn, has a field of view 44*b*, directed toward Arthur 42*a*. Charlie 42*c* is looking between Arthur 42*a* and Bob 42*b*, and his field of view is shown as cone 44*c*. The three users who are interacting with each other are, collectively, looking at a volume in space which is shown as shaded area 48, which will be termed the "restricted area". Projection of an image within the restricted area 48 would be annoying to the users 42*a*, 42*b* and 42*c*, and therefore should be avoided. However, outside of the restricted area 48, the smart house 10 is free to create midair display 46 for David 42*d*, who is not interacting with anyone else. The area outside of the restricted area 48 is referred to as the content allowed area.

Referring to FIGS. 1-3, as discussed above, the method of the invention can be summarized as follows:

Using camera 14 and microphone feed analysis, the context analysis engine on the server computer 18 will identify (a) users (for example Arthur 42*a*, Bob 42*b* and Charlie 42*c*) who are involved in face to face discussion and their level of interaction with each other; (b) the focus point or area of interest for each user (44*a*-44*d*), and (*c*) the degree of attention each user is giving toward some form of content being provided. The "level of interaction" is defined as how deeply one person is involved in interacting with another person. The level of interaction is high if an obstacle between the first person and the second person would create a disturbance to both the first person and the second person.

Accordingly the computing system will identify the aggregated restricted area 48 in 3D space where the midair projection display should not be created. By identifying an aggregated restricted area 48 in 3D space, the midair content is not created in a space that will create an obstacle to a user or will disturb another user.

Software will identify the remaining area where the midair projection 46 will be created, (content allowed area) so the software will set the display area which is convenient to David 42*d* (nearby him in the same facial direction) and will not affect any other user in the surrounding area.

Identification of the users and the determining the restricted area may be repeated at some interval by the computing system while at least one midair projection is being displayed or users are present within the home.

For any notifications and/or newly created midair projections, the computing system identifies the user(s) which will be watching or interacting with the newly created midair projection and generates the notification and/or newly created midair projections in the display area near the user and not in the aggregated restricted area calculated for all identified users. Alternatively, the notification may sent to a mobile device of the user by the computer system.

The user, for which the midair projection is for display to can be identified based on various content. For example, the user can be identified based on which user initiated the midair projection, specific requests sent to media associated with a specific user, for example via an email address or other identification associated with the user, or based on user preferences for content.

For example, if a user, David 42*d* receives a phone call notification, the computing system places the midair projection associated with the phone call notification and phone call in the display area which is nearby David 42*d* and in the same facial direction as David 42*d* and is not present in the aggregated restricted area 48 in three dimensional (3D) space. Alternatively, David 42*d* receives a notification regarding the phone call on his mobile device and the midair projection associated with the phone call is projected in the display area which is nearby David 42*d* and in the same facial direction as David 42*d* and is not present in the aggregated restricted area 48 in 3D space.

For example if David 42*d* has initiated a midair projection regarding how hurricanes form, and Charlie 42*c* has a preference for watching and interacting with programming associated with weather, notifications can be sent to both David 42*d* and Charlie 42*c* and the midair projection displayed in an area that is not present in the aggregated restricted area 48 in 3D space and is in an area of the house that is navigable to for both David 42*d* and Charlie 42*c*.

It should be noted that if a plurality of users are interacting with a midair display, the dimensions and shape of the midair projection being displayed to the plurality of users can be altered automatically as the user's focus point and degree of attention each user is giving toward the content varies and thus the aggregated restricted area in 3D space varies. Small movements of the user will not affect the restricted area in a 3D space.

Figure 4:
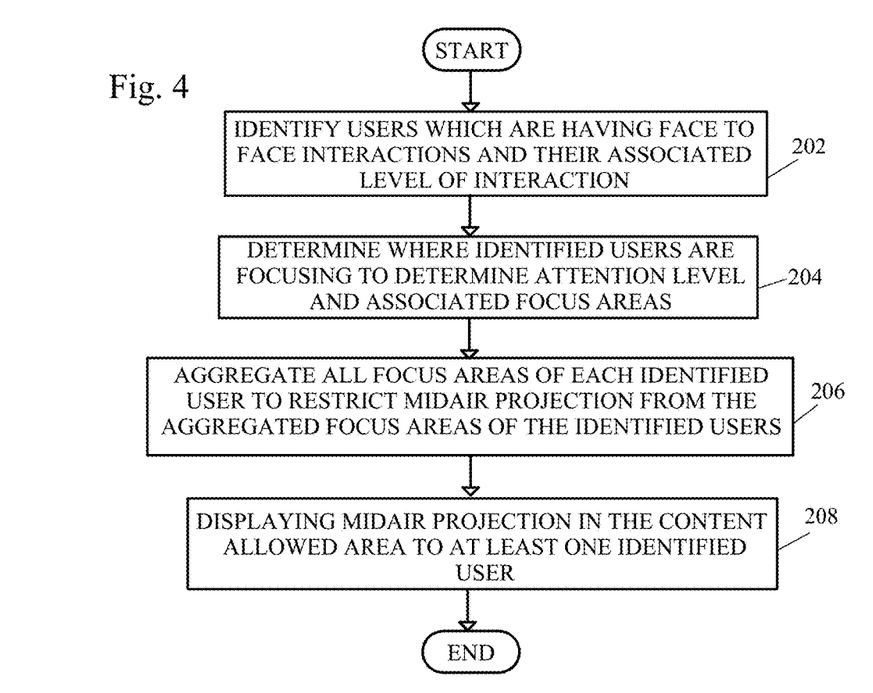
FIG. 4 shows a flowchart of a method of projecting midair projections in a 3D space for multiple users.

Referring to FIG. 4, in a first step, the computing system identifies the users which are having face to face interactions and their associated level of interaction (step 202).

For example, using camera 14 and microphone feed analysis, the context analysis engine on the server computer 18 can identify proximity between users, facial direction of users, and based on the direction of focus of the users, calculate where a user is looking. A face to face interaction can be identified as a major overlap (e.g. greater than 40%) between two facial directions of different users. The level of interaction can be defined as how deeply one person is involved in interacting with another person. The level of interaction is high if an obstacle between the first person and the second person in the major overlap would create a disturbance to both the first person and the second person.

Next, the computing system determines where the identified users are focusing to determine attention level and associated focus areas (step 204).

The attention level may be based on behavior analysis conducted by the server computer 18 based on facial expression of the identified users captured by the camera 14, direction of focus, blinking rate of the user and object of focus. If a user is frequently changing their direction of focus, for example focusing on a display and then focusing on another object frequently, the user's level of focus on the display is above a threshold in comparison to a user which is not changing focus direction from the display, which is below the threshold.

The computer system aggregates all focus areas of each identified user to restrict midair projection from the aggregated focus areas of all identified users and designate all areas not in the aggregated focus cones as content allowed areas where content can be projected without disturbing other identified users (step 206).

The computer system displays at least one midair projection in the content allowed area to at least one identifier user (step 208) and the method ends.

Steps 202 through 206 are repeated at an interval by the computing system after the midair projection is displayed and while midair projections are being displayed or users are present within the area being monitored by the cameras. The interval for repeating steps 202-206 may be every 30 seconds or may be calculated dynamically based on context from the context analysis engine. If the restricted area is recalculated and requires movement of the midair projection, the midair projection is moved to accommodate the recalculated restricted area. The movement of the midair projection is small and will not be noticeable by the identified users interacting with the midair projection.

In an alternate embodiment, prior to step 208 of the computer system displaying the at least one midair projection in the content allowed area, the computer system identifies the user(s) which will be interacting or watching a newly created midair projection (step 220) and the computer system sends a notification regarding the creation of a midair projection to a mobile device of the user in which the newly created midair projection is for or targeted to (step 222). Other users within the vicinity may also be sent notifications by the computer system based on user preferences and context of the midair projection to be projected.

In addition, the user who received the notification can additionally share the notification with other users in a proximity which may be interested in the content of the midair projection.

Additionally, the angular orientation of the at least one midair projection can be calculated by the computer system for the identified user to display the at least one midair projection in clear manner.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of projecting midair projections in a 3D space for multiple users comprising the steps of a computer:
    a) identifying multiple users which are having face to face interactions and an associated level of interactions of the identified multiple users;
    b) determining focus areas of the identified multiple users and attention level of the identified multiple users on the focus areas;
    c) aggregating the focus areas of the identified multiple users to restrict midair projections from the aggregated focus areas of the identified multiple users and designating an area not in the aggregated focus areas as content allowed areas where content can be projected in midair without disturbing the identified multiple users; and
    d) displaying a midair projection in the content allowed area to at least one of the identified multiple users.

2. The method of claim 1, prior to step d) of displaying the midair projection in the content allowed area to the at least one of the identified multiple users, comprising the steps of the computer:
    identifying users interacting with an already displayed midair projection in the content allowed area; and
    sending a notification regarding creation of another midair projection to a mobile device of the identified user.

3. The method of claim 2, further comprising the step of sending a notification to a mobile device of another identified user regarding creation of a midair projection based on content of the midair projection and user preferences.

4. The method of claim 1, wherein step a), step b), and step c) are repeated at an interval when a midair projection is being displayed to identified multiple users.

5. The method of claim 4, wherein the midair projection being displayed to identified multiple users is altered in the 3D space based on the computer recalculating the aggregated focus area of the restricted area of the identified multiple users.

6. A computer program product for projecting midair projections in a 3D space for multiple users, a computer comprising at least one processor, one or more memories, one or more computer readable storage media, the computer program product comprising a computer readable storage medium having program instructions embodied therewith, the program instructions executable by the computer to perform a method comprising:
   a) identifying, by the computer, multiple users which are having face to face interactions and an associated level of interactions of the identified multiple users;
   b) determining, by the computer, focus areas of the identified multiple users and attention level of the identified multiple users on the focus areas;
   c) aggregating, by the computer, the focus areas of the identified multiple users to restrict midair projections from the aggregated focus areas of the identified multiple users and designating an area not in the aggregated focus areas as content allowed areas where content can be projected in midair without disturbing the identified multiple users; and
   d) displaying, by the computer, a midair projection in the content allowed area to at least one of the identified multiple users.

7. The computer program product of claim 6, prior to program instructions d) of displaying, by the computer, the midair projection in the content allowed area to the at least one of the identified multiple users, comprising the program instructions of:
   identifying, by the computer, users interacting with an already displayed midair projection in the content allowed area; and
   sending, by the computer, a notification regarding creation of another midair projection to a mobile device of the identified user.

8. The computer program product of claim 7, further comprising the program instructions of sending, by the computer, a notification to a mobile device of another identified user regarding creation of a midair projection based on content of the midair projection and user preferences.

9. The computer program product of claim 6, wherein program instructions a), program instructions b), and program instructions c) are repeated at an interval when a midair projection is being displayed to identified multiple users.

10. The computer program product of claim 9, wherein the midair projection being displayed to identified multiple users is altered in the 3D space based on recalculating, by the computer, an aggregated focus area of the restricted area of the identified multiple users.

11. A computer system for projecting midair projections in a 3D space for multiple users comprising a computer comprising at least one processor, one or more memories, one or more computer readable storage media having program instructions executable by the computer to perform the program instructions comprising:
   a) identifying, by the computer, multiple users which are having face to face interactions and an associated level of interactions of the identified multiple users;
   b) determining, by the computer, focus areas of the identified multiple users and attention level of the identified multiple users on the focus areas;
   c) aggregating, by the computer, the focus areas of the identified multiple users to restrict midair projections from the aggregated focus areas of the identified multiple users and designating an area not in the aggregated focus areas as content allowed areas where content can be projected in midair without disturbing the identified multiple users; and
   d) displaying, by the computer, a midair projection in the content allowed area to at least one of the identified multiple users.

12. The computer system of claim 11, prior to program instructions d) of displaying, by the computer, the midair projection in the content allowed area to the at least one of the identified multiple users, comprising the program instructions of:
   identifying, by the computer, users interacting with an already displayed midair projection in the content allowed area; and
   sending, by the computer, a notification regarding creation of another midair projection to a mobile device of the identified user.

13. The computer system of claim 12, further comprising the program instructions of sending, by the computer, a notification to a mobile device of another identified user regarding creation of a midair projection based on content of the midair projection and user preferences.

14. The computer system of claim 11, wherein program instructions a), program instructions b), and program instructions c) are repeated at an interval when a midair projection is being displayed to identified multiple users.

15. The computer system of claim 14, wherein the midair projection being displayed to identified multiple users is altered in the 3D space based on recalculating, by the computer, an aggregated focus area of the restricted area of the identified multiple users.

* * * * *